United States Patent [19]

Reynolds

[11] 4,183,246

[45] Jan. 15, 1980

[54] INSULATION PRESENCE SENSING PROBE

[76] Inventor: Steven C. Reynolds, 30150 W. Nine Mile, Apt. 202, Farmington Hills, Mich. 48024

[21] Appl. No.: 913,664

[22] Filed: Jun. 8, 1978

[51] Int. Cl.² ............................................. G01F 23/14
[52] U.S. Cl. .................................................. 73/290 R
[58] Field of Search ....................... 73/37, 40.5 R, 40.7, 73/45.5, 46, 53, 212 R, 272 R, 272 A, 290 R, 290 B, 297–299, 302, 432 HA, 729; 116/65, 114 B, 118 R, 123; 137/557–559; 52/743, 744, 381, 127; 302/2 R

[56] References Cited

U.S. PATENT DOCUMENTS

| | | | |
|---|---|---|---|
| 2,696,606 | 12/1954 | Pomelie | 73/302 X |
| 2,774,324 | 12/1956 | James | 73/290 R X |
| 2,788,552 | 4/1957 | Miles | 52/127 X |
| 3,049,920 | 8/1962 | Allen | 73/291 |
| 3,290,938 | 12/1966 | Miller | 73/290 R |
| 3,385,095 | 5/1968 | DeLeo et al. | 73/4 R |
| 3,673,856 | 7/1972 | Panigati | 73/37.5 |
| 3,927,569 | 12/1975 | Bergdahl | 73/290 V |
| 3,994,169 | 11/1976 | Walford | 73/290 R |
| 4,103,464 | 8/1978 | Clifft et al. | 52/743 X |
| 4,135,397 | 1/1979 | Krake | 73/290 R |

Primary Examiner—Donald Watkins
Attorney, Agent, or Firm—Basile and Weintraub

[57] ABSTRACT

A probe for use when filling the hollow walls of an existing building with insulation. The probe in the present invention detects, by a pressure responsive means, when the insulation being distributed between the walls of a building has reached the level of the probe.

4 Claims, 3 Drawing Figures

INSULATION PRESENCE SENSING PROBE

BACKGROUND OF THE INVENTION

I. Field of the Invention

The present invention relates generally to the field of probes for detecting the presence of insulating material when filling the hollow walls of a building with insulating material.

II. Description of the Prior Art and Prior Art Statement

U.S. Pats. No. 1,055,099; No. 1,661,995; No. 3,680,579; No. 3,817,274; No. 3,048,037; and No. 3,374,764 constitute the closest prior art the inventor has been able to discover relating to the present invention. All of the above-named patents disclose a means for measuring a liquid level. Each of the above level detecting devices is a permanent installation of a measuring device used to measure the liquid level in a tank or the bottom of a ship.

U.S. Pat. No. 3,048,037 constitutes the closest art to the present invention the inventor has discovered. U.S. Pat. No. 3,048,037 discloses a device for measuring the difference in hydrostatic pressure between the top of the liquid in a tank and the bottom of the tank and relating this hydrostatic pressure difference to a liquid level. The device is not portable and the only relationship of this device to the present invention would be the use of pressure to detect the presence of the insulating material in the present invention and the use of a pressure differential to determine a liquid level in the case of U.S. Pat. No. 3,048,037.

SUMMARY OF THE INVENTION

At the present time contractors who install insulation between the walls in existing structures do so by making a series of holes between the vertical studs in the wall and injecting an insulating material such as foam, or the like. The installer has a problem of knowing when the space between the walls has been filled. In some cases the installer may inject as much insulating material as the space can hold, but an obstruction between the studs prevents complete insulation of the vertical space between studs.

In the present invention the insulation installer makes a hole midway between the upper and lower vertical extremities of the wall for inserting a probe. Holes for inserting insulation are made above the probe hole near the top of the wall and below the probe hole near the bottom of the wall.

The probe consists of a hollow closed end tube long enough to reach the interior of the wall and have a portion remaining on the outside of the wall. The inner end of the tube has an aperture along the side of the tube. The aperture covers about one half the circumference of the tube. A pressurized expandable member such as a balloon is disposed inside the probe adjacent to the aperature. A flexible tube connects the balloon to a pressure gauge which is located beyond the outer end of the probe. Air pressure slightly higher than atmospheric pressure is carried in the balloon.

The outer tube of the probe is rotatable around the flexible tube and the balloon contained therein.

When filling the area below the probe with insulation, the probe is turned so the aperture is facing downward, as the insulation is injected into the space the probe hole vents the air from the space as insulation is added. When the insulation reaches the probe it exerts a force on the balloon indicating a pressure increase on the gauge and alerting the operator that the area is filled to the level of the probe. If the space has taken all of the insulating material possible through the lower hole but the probe has not signaled the insulating material having reached that level, a restriction between studs has been discovered and an additional hole for inserting insulation between the first hole and the probe is required to do a complete job of insulating the wall.

Once the insulation has reached the level of the probe from the bottom, the probe is turned until its aperture faces upward and insulating material is inserted into the upper hole. When the space has been filled from above, the insulating material will exert a force on the balloon indicating a pressure increase on the gauge. If a blockage exists between the upper filler hole and the probe, no indication of a pressure increase will show on the gauge. In this case a second filler hole between the probe and the first upper filler hole will be required to completely fill the space between studs.

Other objects, advantages and applications of the present invention will become apparent to those skilled in the art of insulation presence sensing probes when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the several views wherein.

DESCRIPTION OF THE PREFERRED EMBODIMENT

Figure 4:
FIG. 4 is a partially cross sectioned view of the probe in the present invention.

Referring now to the drawing and in particular to FIG. 4 wherein there is illustrated probe 20 comprising a closed end tube 22 with an aperture 24 near its closed end. The aperture 24 is open for about one half the circumference of tube 22. A pressure expandable member 26 is disposed near aperture 24. Member 26 has a pressure connection connected to one end of a length of flexible tubing 28. The other end of flexible tube 28 is connected to a pressure gauge 30. Member 24 and flexible tube 28 are filled with an air pressure slightly above atmospheric pressure such that only a light force on member 24 registers a pressure increase on gauge 30.

Figure 2:
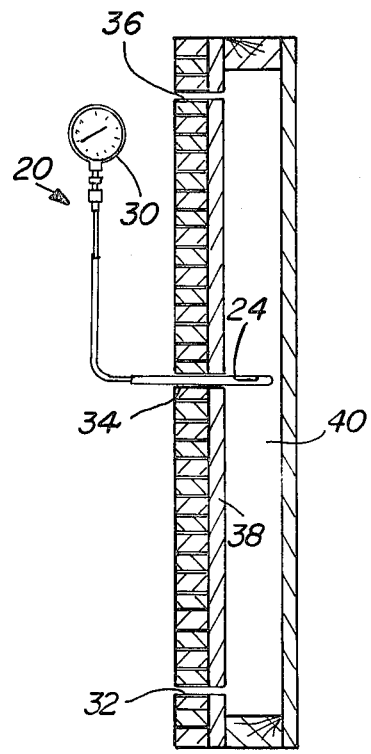
FIG. 2 is a cross sectioned view of FIG. 1 taken along line 2—2 in FIG. 1.
Figure 3:
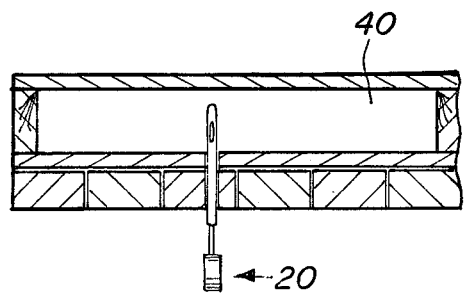
FIG. 3 is a cross sectioned view of FIG. 1 taken along line 3-3 in FIG. 1.
Figure 1:
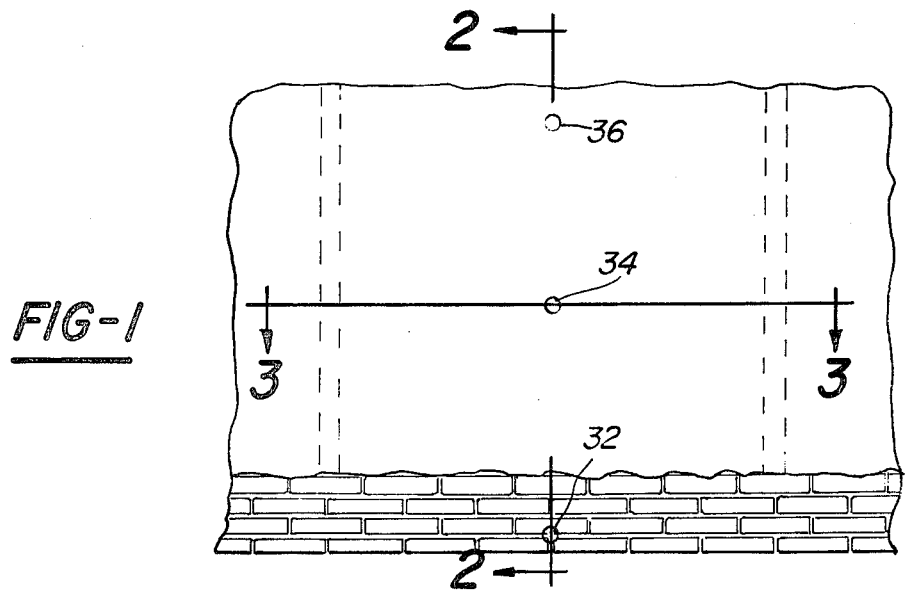
FIG. 1 is an outside view of a typical hollow wall of a building to be filled with insulating material.

Referring now to FIGS. 1, 2 and 3. In FIG. 1 openings 32, 34 and 36 are made in the outside wall 38 allowing access to the hollow portion of the wall 40. Probe 20 is inserted into opening 34 penetrating to the depth shown in FIG. 2. Tube 22 is rotated so that aperture 24 faces downward. Insulating material is injected through opening 32 until the insulating material reaches the probe. When the probe is reached the insulation exerts a force on member 26 giving a pressure rise indication on gauge 30 indicating the wall to be filled to the probe.

Probe 22 is then rotated until aperture 24 is facing upward and insulation is injected through opening 36. When the space above the probe has been filled, the insulating material will exert a force on member 26 showing a pressure rise at gauge 30.

If a blockage exists within space between studs between the probe and the opening where the insulation is injected, no pressure indication on gauge 30 will be detected to indicate complete filling of the space between studs. The operator will then make an additional hole closer to the probe to by-pass the blockage.

What is claimed is:

1. An insulation presence sensing probe comprising:
   a pressure gauge having a pressure inlet;
   a probe having sufficient length to permit said probe to be inserted through an opening in an external wall of a building into the space between said external wall and the internal wall of said building with a portion of said probe remaining outside said external wall;
   said probe being of tubular construction and havng an aperture along a wall of said probe;
   a pressure expandable member contained within said probe adjacent to said aperture;
   a length of flexible tubing connecting said pressure inlet and said pressure expandable member;
   said pressure expandable member and said flexible tubing being pressurized above atmospheric pressure, said pressure expandable member and said flexible tubing being rotatably contained within said probe.

2. The insulation presence sensing probe as defined in claim 1 wherein said pressure expandable member and said flexible tubing are charged with a compressible gas.

3. The insulation presence sensing probe as defined in claim 1 wherein said pressure expandable member and said flexible tubing are filled with a liquid.

4. The insulation presence sensing probe as defined in claim 1 wherein said pressure expandable member and said flexible tubing are filled with air.

* * * * *